United States Patent
Rickrode

(10) Patent No.: US 8,756,248 B1
(45) Date of Patent: Jun. 17, 2014

(54) RAPID ACCESS INFORMATION DATABASE (RAID) SYSTEM AND METHOD FOR MOBILE ENTITY DATA AGGREGATION

(71) Applicant: C. Joseph Rickrode, Nashua, NH (US)

(72) Inventor: C. Joseph Rickrode, Nashua, NH (US)

(*) Notice: Subject to any disclaimer, the term of this patent is extended or adjusted under 35 U.S.C. 154(b) by 0 days.

(21) Appl. No.: 13/874,528

(22) Filed: May 1, 2013

Related U.S. Application Data

(60) Provisional application No. 61/664,702, filed on Jun. 26, 2012, provisional application No. 61/810,670, filed on Apr. 10, 2013.

(51) Int. Cl.
*G06F 17/30* (2006.01)

(52) U.S. Cl.
USPC .......... 707/770; 707/706; 707/758; 709/201; 709/217; 709/227; 340/425.5; 340/988

(58) Field of Classification Search
None
See application file for complete search history.

(56) References Cited

U.S. PATENT DOCUMENTS

| | | | | |
|---|---|---|---|---|
| 5,963,129 | A * | 10/1999 | Warner | 340/468 |
| 6,621,422 | B2 * | 9/2003 | Rubenstein | 340/988 |
| 6,868,313 | B2 * | 3/2005 | Koljonen | 701/1 |
| 6,958,688 | B1 * | 10/2005 | Barnett | 340/506 |
| 7,797,309 | B2 * | 9/2010 | Waters | 707/718 |
| 8,260,489 | B2 * | 9/2012 | Nielsen et al. | 701/32.2 |
| 8,612,090 | B2 * | 12/2013 | Nielsen et al. | 701/32.2 |
| 2001/0007975 | A1 * | 7/2001 | Nyberg et al. | 705/1 |
| 2003/0028536 | A1 * | 2/2003 | Singh et al. | 707/10 |
| 2003/0200227 | A1 * | 10/2003 | Ressler | 707/104.1 |
| 2004/0093291 | A1 * | 5/2004 | Bodin | 705/35 |
| 2004/0225681 | A1 * | 11/2004 | Chaney et al. | 707/104.1 |
| 2005/0033482 | A1 * | 2/2005 | Koljonen | 701/1 |
| 2005/0285721 | A1 * | 12/2005 | Bucholz et al. | 340/426.1 |
| 2006/0184575 | A1 * | 8/2006 | Singleton | 707/104.1 |
| 2007/0094268 | A1 * | 4/2007 | Tabe | 707/10 |
| 2007/0239473 | A1 * | 10/2007 | Picolli | 705/1 |
| 2008/0208832 | A1 * | 8/2008 | Friedlander et al. | 707/5 |
| 2009/0016496 | A1 * | 1/2009 | Bulmer | 379/45 |
| 2010/0257477 | A1 * | 10/2010 | Nielsen et al. | 715/771 |
| 2011/0282542 | A9 * | 11/2011 | Nielsen et al. | 701/33 |
| 2012/0066507 | A1 * | 3/2012 | Jobmann | 713/186 |
| 2013/0116855 | A1 * | 5/2013 | Nielsen et al. | 701/1 |

* cited by examiner

*Primary Examiner* — Hung Le
(74) *Attorney, Agent, or Firm* — Luis Figarella

(57) ABSTRACT

A method and system for providing a rapid access data aggregation information source having a single contact portal for multiple information resources that supports law enforcement/emergency response (LE/ER) agencies in order to provide the access to data elements (both constant and transient) belonging to mobile entities, including but not limited to vehicles such as cars, trucks, tractors, buses, motorcycles, boats, airplanes, RVs and others. A focal intention of the data aggregation system is to provide rapid response support through a single contact point for information delivery to LE/ER agencies in the shortest possible time.

17 Claims, 4 Drawing Sheets

RAPID ACCESS INFORMATION DATABASE (RAID) SYSTEM AND METHOD FOR MOBILE ENTITY DATA AGGREGATION

CROSS-REFERENCE TO RELATED APPLICATIONS

This application claims priority to U.S. provisional patent application Ser. No. 61/664,702 titled "Method and System for Mobile Entity theft reduction and Law enforcement management via an On-Board Identity" filed on Jun. 26, 2012 as well as application Ser. No. 61/810,670 "Method and System for Mobile Entity Theft Reduction and Law Enforcement Management Via an ON-BOARD IDENTITY" filed on Apr. 10, 2013, the disclosure of which is herein incorporated by reference in their entirety.

PATENTS CITED

The following documents and references are incorporated by reference in their entirety, Chen et al (U.S. Pat. No. 6,684,155).

BACKGROUND OF THE INVENTION

Daily, many mobile entity thefts (including vehicles such as cars, trucks, tractors, buses, motorcycles, boats, airplanes, RVs and others) occur whose outcome might be improved by prompt notification of law enforcement/emergency response (LE/ER) agencies. In particular, with the advent of GPS location and communication capabilities, existing examples of what these capabilities can do are sometimes seen in the news and elsewhere. Sadly, in many cases such support is currently delayed by presently existing system hurdles and roadblocks which cumulatively can lead to an adverse outcome, perhaps even resulting in loss of life. Often, these multiple roadblocks need to be maneuvered one at a time in virtually a tip-to-tail sequence before determining if the needed GPS location information is even available, let alone how to rapidly and even legally get the appropriate information to the LE/ER unit needing to act on said information.

Presently, a broad selection of vehicle manufacturers GPS capable navigation options exist, including the primaries: BMW Assist, Ford SYNC, GM OnStar, Lexus Link, Hyundai Blue Link, Mercedes TeleAid, Toyota Safety Connect. The needed information is localized and provided by multiple separate service providers (e.g. On-Star, BMW and others), some of which are controlled by large industrial providers such as vehicle manufacturers while other much smaller independent aftermarket GPS equipment providers exist which substantially outnumber the vehicle manufacturers. Such GPS relevant information is typically stored electronically in the independent database of each participating provider in the industry. As time goes by and market providers expand, the number of individual databases could expand substantially making the process of getting the needed mobile entity location information to LE/ER agents progressively more complicated (and longer in time) in situations where a potential felony event may be in progress or swift medical support would save a life. Rapid appropriate LE/ER agencies involvement not only save lives but also can prevent insurmountable property damage losses and bodily injury or even death risks to innocent bystanders.

The typical anomalies needing to be dealt in such situations include determining; type of mobile entity; whether it is equipped with on-board GPS monitoring capability; whether its on-board GPS monitoring is functioning (i.e. is the subscription up to date? can it be activated?; the specifics of the entities radio frequency (RF) signals; owner's/authorized entity legal level of authorization for data/location access; any existing owner/operator pre-existing or emergency response type guidelines on file and pre-approved by the owner of record; etc.

According to the FBI published statistics, 737,142 vehicles were stolen in 2010 at a replacement cost of $4.5 billion, equating to 1 vehicle theft every 43 seconds. An additional 47,791 motorcycles were also stolen, many costing over $20,000 each, but not in the $4.5 billion cost. Only 11.8% of these 785,000 total thefts were cleared by arrests or other means. Carjacking was involved in 22,000 of the vehicle thefts, often adding personal injury or death and property damage costs not included in the $4.5 billion. Additional related costs include insurance premium increases, the cost of time spent dealing with police, vehicle rental costs, and the cost of time off from work.

In short, the bad guys WON 88.2% of the time in 2010. With vehicle theft potentially striking any one of the 250 million vehicle existing across the US and presently hitting about 700,000 vehicles annually, it's time to utilize mobile communication and tracking technology (including GPS, mobile telephony, mobile internet, RFID and others) technology to take effective action in attacking this problem.

The current situation is that millions in the US and other countries pay a penalty every year to cover others' incurred costs from vehicle thefts, something that has been with us for over 100 years. Presently, the auto insurance industry pays out about $5 Billion annually as reimbursement for vehicle thefts but this staggering amount is only a small portion of the $25+ Billion of comprehensive insurance revenue insurance companies collect from the approximate 190 million individuals carrying comprehensive at an (US wide) average annual cost of $133 per vehicle per year.

Estimates indicate that as many as 75% of vehicles produced since 2000 are reported to have wired-in (not readily disconnected) GPS modules but only 25%-30% are used because manufacturers' Navigation Package options cost $1200-$2000 at vehicle purchase and $200-$300 per year to maintain service. In 2010, there were 250 million registered vehicles in the US with an AVERAGE useful life of eight years, so most vehicles on the road today should have a built-in GPS signature available for use.

Existing technologies could substantially help theft recovery are just not being focused on beating down these astronomical theft losses. The primary system weaknesses today stem from time to action and lack of tools. According to the FBI issued 2010 vehicle theft summary report, only a 1-2 hour window exists before many stolen vehicles in city areas are "gone" via chop shop, hide-away (cargotainer (Cargo container)/semi-trailer), border crossings, etc.

While many vehicles have navigation/communication packages (e.g. BMW Assist, Ford SYNC, GM OnStar, Lexus Link, Hyundai Blue Link, Mercedes TeleAid, Toyota Safety Connect, etc.), these separate and independent operators must follow legal and liability guidelines with various process steps and information/authorization handoffs before law enforcement can get the necessary information to pursue the vehicle theft. As a result, some of these operators require that a full police report be filled out and verified prior to tracking, often taking several hours or even days.

Another operator (owned by a vehicle manufacturer) will not activate thefts recovery services until police verify that a vehicle is officially reported and confirmed stolen by the confirmed rightful owner. LE/ER agencies have stated that systems like LoJack and others only broadcast their RF signal about 3-5 miles and require special RF equipment found in only a few police cars.

What is needed, is a centralized aggregation system capable of interfacing with the LE/ER agencies to receive and clear the information requests in a timely fashion, while ensuring that the appropriate bona fides (jurisdictional, legal, liability and other technicalities) have been established and satisfied so that the one or more individual system operators of navigation/communication packages can provide information and even control of the mobile entity to the LE/ER agents.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

In one aspect the invention is about a central contact Rapid Access Information Database (RAID) system for mobile entity data aggregation comprising a rapid access information database (RAID) comprised of one or more central servers interfaced to one or more vehicle manufacturers' and/or aftermarket GPS equipment providers' databases providing additional and supporting information to form a RAID NET, said central server having the ability to rapidly collect both constant and transient data for one or more mobile entities from said databases, said data including at least one of said entity's data elements, interfacing means for authorized entities to register one or more mobile entity's and legally authorize said entity's data to be accessed by said aggregation system, communication means for secure interfacing to said RAID by authorized members of law enforcement/emergency response (LE/ER) agencies, legal clearance means to establish said LE/ER agencies legal authority to obtain said entity's data from said databases and routing means for querying from said database(s) said requested entity's appropriate data elements and communicating said appropriate data elements to said LE/ER agency.

In another aspect, said one or more databases include independent databases operated by separate service vendors. In yet another aspect, said entity's data elements include constant data comprised of at least one of type, Vehicle ID Number (VIN), Serial Number, License, Plates, License Plate Number, Highway RFID tag number, Owner's information (including name, address, phone numbers), authorized operator's information (incl. name, address, authorized operator's phone numbers and said entity's data elements include variable data comprised of at least one of GPS location, operational status, history of movement, operation or RFID tag reading. In yet another aspect one or more LE/ER agency members exercises control over said mobile entity's on-board system capabilities either directly or through control of said on-board system operator.

In one aspect, said legal clearance means comprise electronic legal clearance means. In another aspect, one or more systems modules using said RAID system interfacing means to allow an authorized entity's request to perform at least one of the following functions; turn on vehicle functions, turn off vehicle functions, activate RAID monitoring for a specific vehicle or disable a stored or parked vehicle. In yet another aspect, one or more modules using said RAID system interfacing means to act upon an authorized entity's requests about mobile entity's transient data exceeding at least one of the following condition; said mobile entity location being outside a pre-defined area, one or more extended stops, power transitions from on to off exceeding a specified threshold. In another aspect, one or more modules using said RAID system interfacing means to automatically alert one or more LE/ER agencies after a mobile entity classified a static, stored or parked is powered up or moved.

In one aspect the invention is about a central contact Rapid Access Information Database (RAID) method for mobile entity data aggregation comprising providing access to a rapid access information database (RAID) comprised of one or more central servers interfaced to one or more databases to form a RAID NET, said central server having the ability to rapidly collect both constant and transient data for one or more mobile entities from said databases, said data including at least one of said entity's data elements, providing interfacing means for authorized entities to register one or more mobile entity's and legally authorize said entity's data to be accessed by said aggregation system, providing communication means for secure interfacing to said RAID by authorized members of law enforcement/emergency response (LE/ER) agencies, providing electronic legal clearance means to establish said LE/ER agencies legal authority to obtain said entity's data from said databases, providing routing means for querying from said database(s) said requested entity's appropriate data elements and communicating said appropriate data elements to said LE/ER agency.

In one aspect the invention is about a non-transitory computer-readable medium for storing computer code for a rapid access information database (RAID) system for mobile entity data aggregation comprising a rapid access information database (RAID) comprised of one or more central servers interfaced to one or more databases to form a RAID NET, said central server having the ability to rapidly collect both constant and transient data for one or more mobile entities from said databases, said data including at least one of said entity's data elements, interfacing means for authorized entities to register one or more mobile entity's and legally authorize said entity's data to be accessed by said aggregation system, communication means for secure interfacing to said RAID by authorized members of law enforcement/emergency response (LE/ER) agencies, electronic legal clearance means to establish said LE/ER agencies legal authority to obtain said entity's data from said databases and routing means for querying from said database(s) said requested entity's appropriate data elements and communicating said appropriate data elements to said LE/ER agency.

Other features and advantages of the present invention will become apparent upon examining the following detailed description of an embodiment thereof, taken in conjunction with the attached drawings.

The above-described and other features will be appreciated and understood by those skilled in the art from the following detailed description, drawings, and appended claims. Emergency Response applications would generally follow similar application guidelines as depicted for the figures defined for Law Enforcement. As is understood to apply with all LE support requests, all ER support requests must come through an "authorized channel" such as a central dispatch or headquarters function pre-approved by RAID to receive confidential GPS related information.

DETAILED DESCRIPTION OF THE PREFERRED EMBODIMENT

To provide an overall understanding of the invention, certain illustrative embodiments and examples will now be described. However, it will be understood by one of ordinary skill in the art that the same or equivalent functions and sequences may be accomplished by different embodiments that are also intended to be encompassed within the spirit and scope of the disclosure. The compositions, apparatuses, systems and/or methods described herein may be adapted and modified as is appropriate for the application being addressed and that those described herein may be employed in other suitable applications, and that such other additions and modifications will not depart from the scope hereof.

Figure 1:
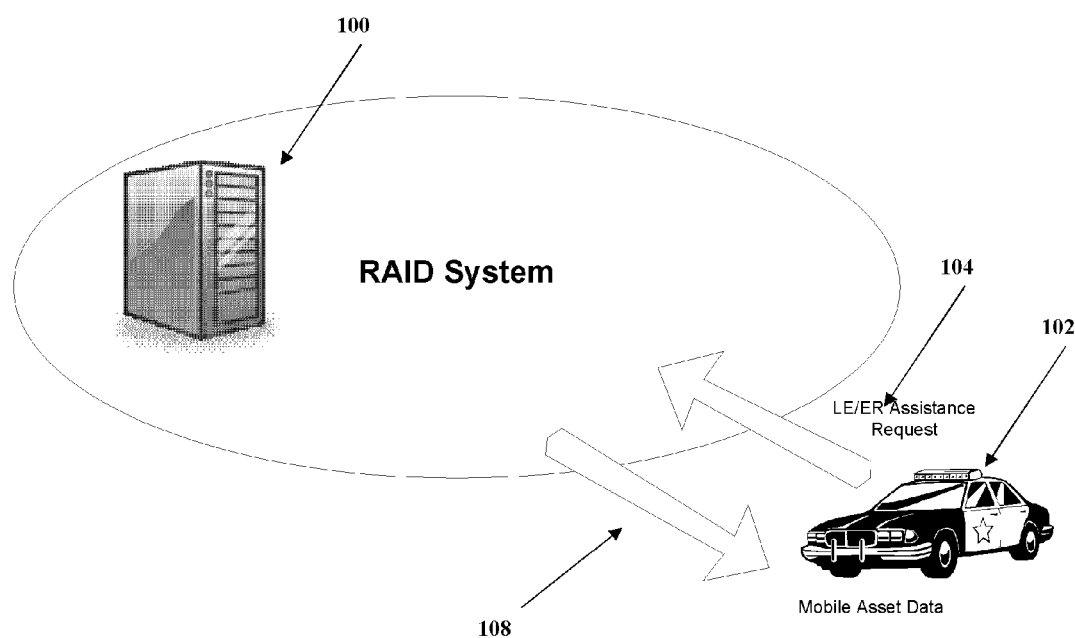
FIG. 1 illustrates a simple form of the aggregation system rapid access information database (RAID) wherein all the necessary information, documentation, and vehicle owner pre-approvals to respond rapidly in the event of a vehicle theft or personal emergency are on file so that LE/ER agencies requests, received from authorized requestors such as a central dispatch or headquarters function, get immediate mobile entity status and support, according to an exemplary embodiment of the invention.

Referring to FIG. 1, we illustrate an exemplary embodiment of a rapid access mobile entity data aggregation system 100 centering around a single authorized Law enforcement/ emergency response (LE/ER) agency (such as the Local or State police, Fire Dept., Medical response, etc.) information resource point. In such a fashion, a central portal would supply LE/ER agents 102 needed information while performing their duties, as well as all of the details for access/approval/support/communication to/from LE/ER agencies.

The proposed Rapid Access Information Database (RAID) aggregation system 100 would act as a single data clearinghouse or central contact portal when receiving information requests 104 from authorized LE/ER agents 102 (e.g. legal status of a vehicle seen to pass a red light). Said request may be entered directly by the LE/ER agent 102 via data or voice if pre-approved to do so, or via their central dispatch or headquarters. In many cases, the RAID system 100 may already have the appropriate data and may then be able to quickly respond with the appropriate data 108 to the agent 102. The RAID system is formed from one or more individual servers and/or virtual portions of the servers, operating as a proprietary RAID network (RAID NET) capable of interfacing over communication links with both LE/ER agents 102 as well as other servers within the RAID database via the Internet.

In many cases, one or more data elements may not be present within the RAID system 100, at which point the RAID system 100 may contact one or more independent system operators 202, 204, 206, forming a RAID NET 208 of data links and servers encompassing one or more of said RAID servers in communication with both LE/ER agents/ agencies units/servers and said independent operators. These operators may comprise the individual mfrs. systems described above (BMW, Ford, GM, Lexus, Hyundai, Mercedes, or Toyota, et al.), RFID Tolls tag operators (E-ZPass, EZ Tag, I-Pass, i-Zoom, SunPass, et al.), Traffic enabled GPS systems reporting traffic conditions to each other, etc.

Access to the RAID system 100 would begin by establishing the bona fides of the LE/ER agent 102 performing the request. Whether by voice or data, the RAID system would establish that the LE/ER entity 102 performing the request is authorized to perform such an action. This would include either actual clearing with said entity's supervisory function (such as central dispatch or headquarters), or valid authorization of a transaction code.

Figure 2:
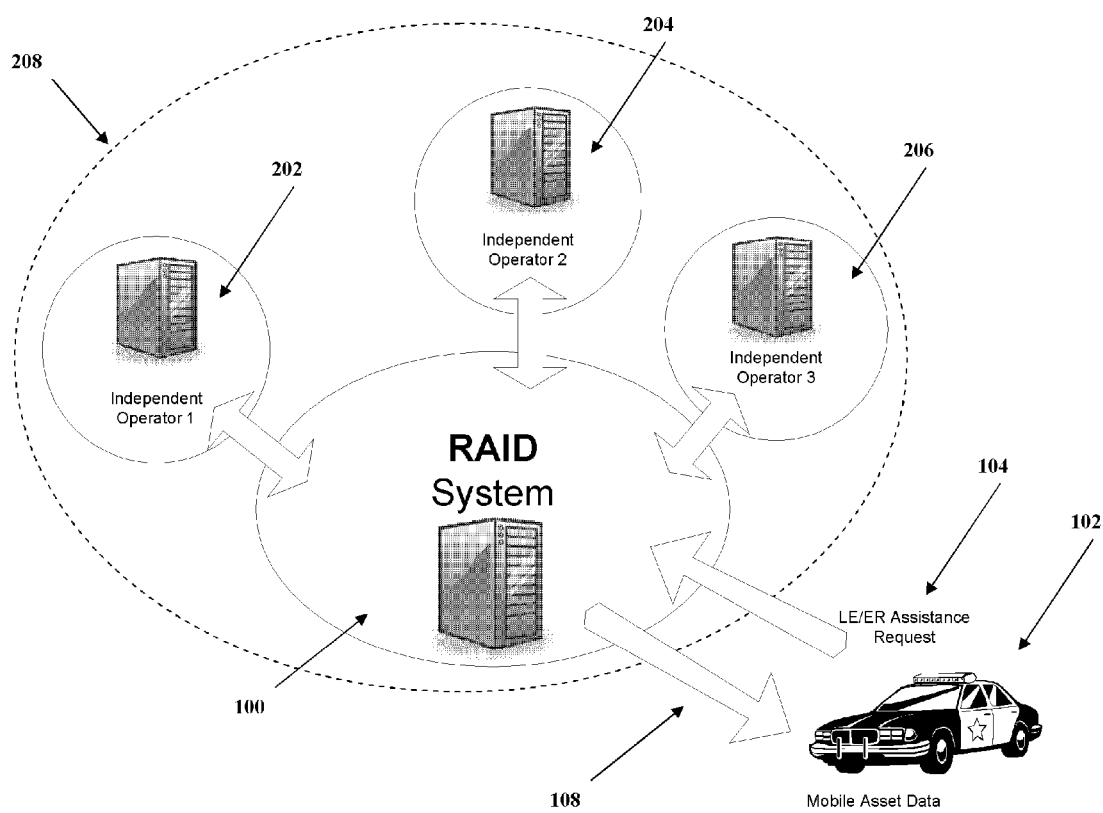
FIG. 2 illustrates how the Rapid Access Information Database Network (RAID NET) aggregation system would interface to one or more independent operators to establish a functional LE/ER interface support system in the shortest time period while maintaining the confidentiality of the individual vehicle and aftermarket manufacturers' proprietary GPS networks yet cooperatively providing rapid LE and ER support to authorized requestors through one common information access point, according to an exemplary embodiment of the invention.

Similarly in FIG. 2, the RAID system 100 interfacing with the one or more independent operators 202, 204, 206 would not be ad hoc, but would be using secure communication means such as secure transactional channels (again, be they voice, data or a combination) so that a clear understanding that the RAID system 100 is acting under legal authority of the requesting agent 102 is established and duly authorized. Among other things, the above legal authority means represent that, based on defined authorization levels, in many cases, the RAID system would be able to discriminate providing certain data elements/information to one level of agent 102 (say State Police or FBI) that it would not provide to a Sheriff Deputy, Constable or Ambulance driver until authorization has been procured.

Within the RAID system 100 the data about a mobile entity may be comprised of two major types or elements, constant data and transient data elements. The constant or permanent elements are comprised of information that either never changes, or changes slowly (say as a matter of days or months). The constant data elements (FIGS. 3-4) include a mobile entity's type (e.g. car 402, motorcycle 302, construction equipment 304, boat 306, snowmobile 308), make, model, color, size, shape, Vehicle ID Number (VIN), Serial Number, License Number, Highway RFID tag number, Owner's information (including name, address, phone numbers), authorized operator's information (incl. name, address, authorized operator's phone numbers), etc.

The transient data elements are those more critical. They are closely related to temporal changes to the vehicle. These include recent GPS location(s), operational status, history of movement and/or operation, most recent Toll booth RFID tag readings, most recent Navigation system communication with other units, etc.

The rapid location of a vehicle is critical in theft situations per the FBI defined 1-2 hour vehicle recovery window. The most direct approach to a RAID system 100 providing rapid LE/ER agent support could result from a cooperative effort by the existing GPS service provider 202 (say BMW or the multitude of other existing manufacturers and aftermarket proprietary GPS databases) to provide either real-time or near-real time (say within minutes) GPS vehicle location identification and feedback through the RAID system 100 communication or other routing means, e.g. data portals, voice services or other interfacing means serving LE/ER agents needs. Note that in one embodiment, a standalone RAID database could evolve (similar to those provided by independent service providers (202, 204, 206) wherein the data is connected through a virtual private network.

It would be functionally effective to be able to conduct a license plate number lookup within the RAID system to determine if the vehicle was recorded as having GPS capability aboard; and whether the GPS was always broadcasting or needed to be activated (either by a separate service provider (202, 204, 206) or the RAID system before its location is provided to authorized LE/ER agencies. In particular, LE/ER agencies have expressed the need for a vehicle theft notification that can be promptly reported and confirmed as "legitimate" via a defined procedure wherein the vehicle location is identified within 15 minutes after the theft.

Given the constant flux of privacy laws and regulation, a critical part of the RAID system 100 will be the system's ability to have knowledge about whether an authorized entity 310 (including owners or legally authorized operators) has legally enabled or acknowledged 312 that the RAID system 100 has the legal authority to seek such information from said independent operators 202, 204, 206. Such legal clearance means are critical. They-separate ad hoc calls to GPS information centers from properly cleared and authorized queries. In one embodiment, the legal clearance means comprise both voice and electronic means for LE/ER agents to provide the appropriate password or other suitable bona fides verbally to the RAID operator. In another embodiment, the RAID system has the roster of approved LE/ER agents. In another embodiment, the LE/ER vehicle is equipped with identification means such as encrypted one time password generation upon inquiry by the RAID system.

In one embodiment, such a RAID system might likely include compliance requirements so that GPS tracking can only be performed if a felony is confirmed by authorized LE/ER and the vehicle owner approves GPS tracking or has a pre-approval filed. In addition, the RAID system 100 may notify and receive LE/ER agent 102 acknowledgement of defined guidelines within its jurisdiction, and insure that the entity reporting a vehicle theft is a legitimate owner (via voice/electronic confirmation or password/PIN), be listed on file as authorized to control the vehicle (e.g., legal operator, lease owner, government or military) or has defined recovery/possession rights (REPO agency).

Various types of vehicle owner approval procedures have already been utilized by independent GPS equipment providers 202, 204, 206 who offer GPS tracking as part of their subscription based manufacturers Navigation and/or Communication options or GPS aftermarket packages. In one embodiment, legally and/or formally re-confirming existing vehicle owner approvals and defining conditions to be met regarding any additionally needed privacy rights protections would be accomplished by the RAID system 100 before enabling the recovery functions.

Figure 3:
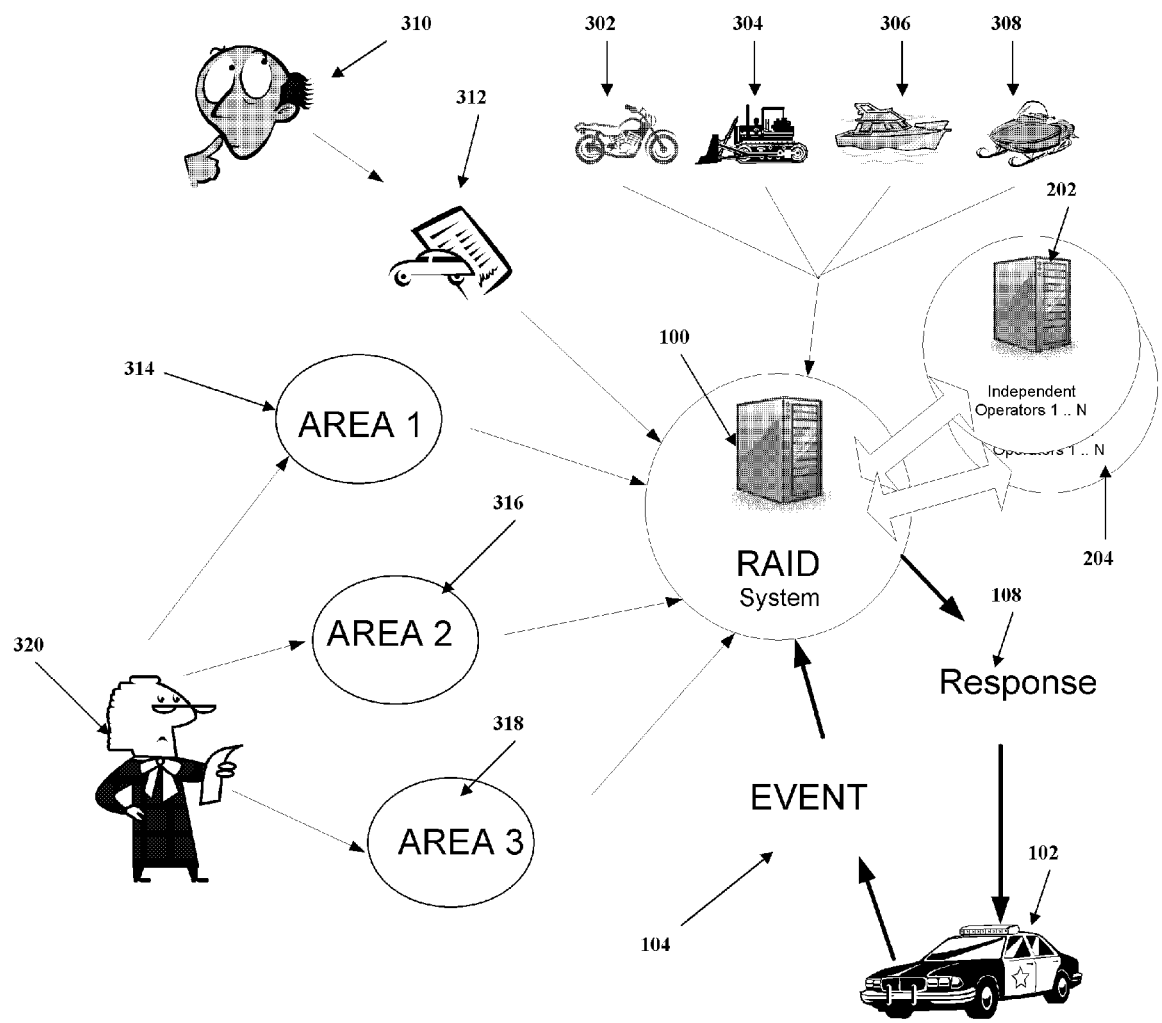
FIG. 3 illustrates the basic information transaction types and elements utilized during one or more system transactions, according to an exemplary embodiment of the invention.

As we see in FIG. 3, the process of providing the legal clearances to the RAID system 100 may be accomplished via a number of avenues or means. In one embodiment 310, owners of high value GPS equipped vehicles will likely willingly file RAID pre-approvals 312 permitting immediate GPS tracking by LE/ER agencies upon request by the owner (say they feel the vehicle has been stolen, or a family member using the vehicle can't be located, etc). In these cases, through the RAID system interfacing means, the owner defines and documents the conditions under which the RAID system may provide LE/ER GPS tracking info to locate their vehicle. The use of such pre-approvals will likely grow as vehicle owners become progressively more comfortable with GPS monitoring and positive results occur from GPS usage for theft and emergency recovery situations.

In other embodiments, metropolitan areas, counties, state, etc. 320 experiencing a greater need for RAID capabilities may make RAID identity listing plus related vehicle details a part of their vehicle registration program 314 such that every registered vehicle included details relating to a GPS presence and functionality indication along with its VIN and license plate number, as a minimum of RAID recorded details, all defined by the appropriate State/Local privacy regulations. The RAID interfacing means would capture this data.

In another embodiment, such registration may occur as part of the regular vehicle inspection 316 for safety where, if so equipped, GPS functionality could be confirmed and GPS signature versus license plate number verified. Under certain other guidelines, and again following applicable privacy rights safeguards were in place, a "confirmed" vehicle owner or an authorized agent reporting a theft could provide the license plate number and VIN from the vehicle's registration to launch a LE locate and recover activity. Adding a small fee to each and every vehicle registration charge could fund RAID system operations.

Under certain exceptions where authorized, LE/ER may be permitted to locate and/or monitor data elements from specifically designated "Vehicles of Interest" 318, such as those of suspected terrorists, registered sex offenders, defined Amber Alerts, etc. Similarly, an owner may decide to track his vehicle on loan to someone else. In one embodiment, the owner may alter the classification of his vehicle as "stored" or "disabled" or "long term parked" (i.e. not expected to be moved), and may request that upon any movement or even when the vehicle is powered up, he/she receive an automated notification.

In one embodiment, the RAID system may accomplish this function, where in alternate embodiments the owner accomplishes this through an app or separate program that regularly requests information about an asset (using the RAID system means) and compares it. In another embodiment, Critical vehicle related data (the GPS RF signature, vehicle control (shutdown or activate) codes) may be supplied by the authorized entity (owner/operator) to the LE/ER agent, an approved by the RAID system as entered for monitoring. In cases where the individual systems are not proprietary to a manufacturer or where there is an aftermarket GPS equipment installed on the vehicle, an owner or LE/ER agent may make unique/discrete monitoring &/or control requests to be conducted through RAID system oversight.

As we see then, in one embodiment a confirmed event may generate a request 104 from an LE/ER agent 102 which having a confirmed stolen vehicle report responds by asking RAID 100 for a most recent vehicle location GPS coordinates. The RAID system 100 reacts by taking the available information (usually a License Plate) and checking that the owner 310 allows tracking 312, then checks the RAID database for the information and if not found requesting the information from the listed operator 204 (e.g., On-Star) for the vehicle location information. On-Star verifies that RAID 100 is allowed to receive the information, and proceeds to provide it. RAID 100 then determines that the LE/ER agency asking is a Boston police officer, but that the location of the vehicle is in NY. RAID proceeds to ensure that the LE/ER 102 has jurisdiction (say they are in hot pursuit), at which point the information is provided. If the LE/ER 102 has no jurisdiction (jealous boyfriend following girlfriend's vehicle that has not been reported stolen), information is withheld from LE/ER 102 and instead the appropriate supervisory entities are contacted. Otherwise, the legalities being satisfied, the information 108 (and required updates) are constantly provided to the LE/ER agents 102 by the RAID system 100.

Figure 4:
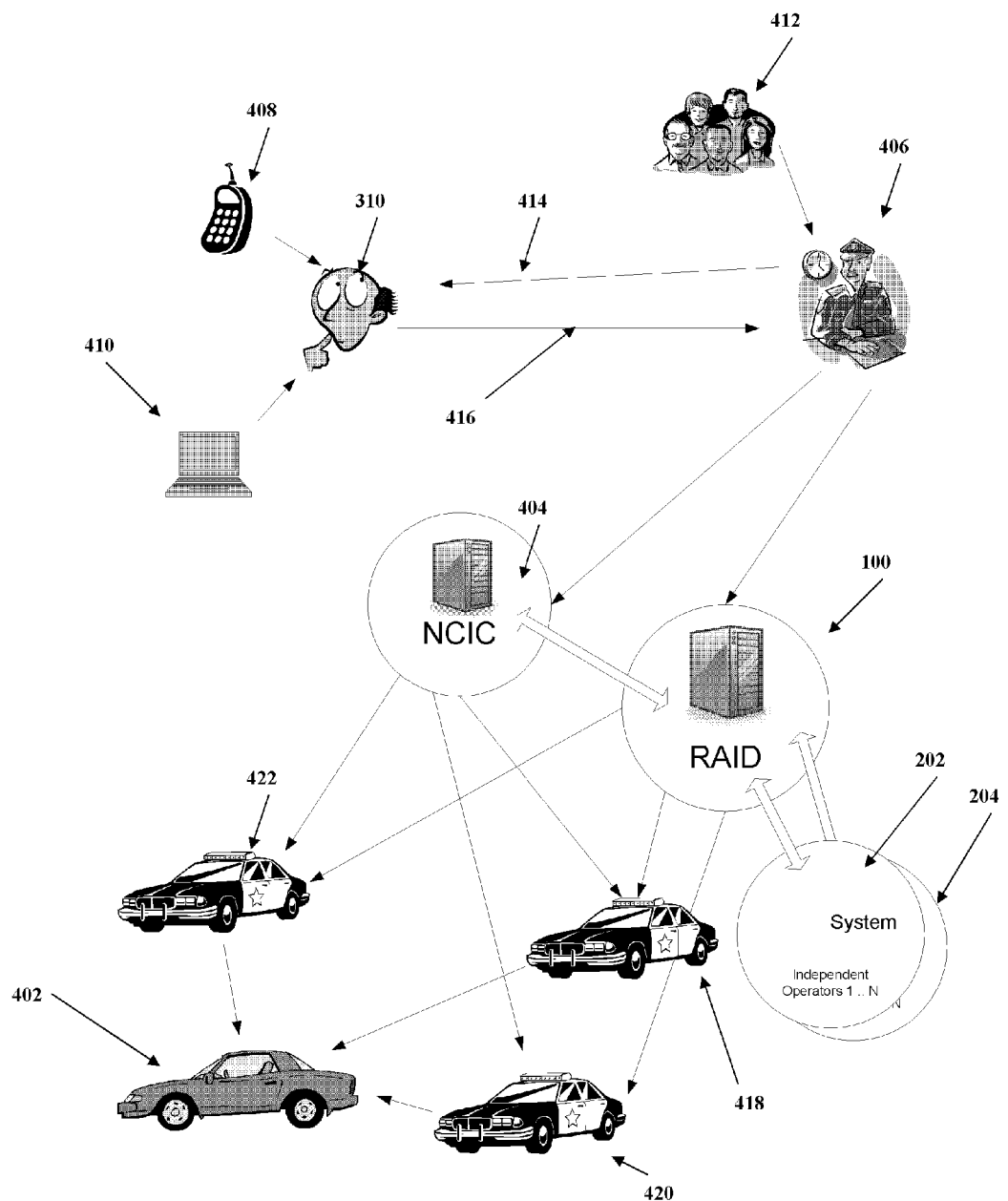
FIG. 4 illustrates the various processes that theft discovery, notification and recovery activities might typically unfold, including NCIC listing and the involvement of other LE/ER agencies in the event that a stolen vehicle has departed local jurisdictional boundaries, according to an exemplary embodiment of the invention.

As we illustrate in FIG. 4, the RAID system 100 comprises resources focused on LE/ER needs, which include the structure to have communication capabilities for interactive government established crime fighting networks, such as the FBI's National Crime Information Center (NCIC) 404 for situations where a stolen vehicle 402 has gotten beyond a local LE/ER agency 406 jurisdiction, say because enough time has elapsed before the vehicle theft was reported. Today, many LE/ER agencies 406 are presently helpless most of the time because there is no rapid response resources coupled to the broad reaching NCIC system.

In one embodiment, an owner 310 has configured his Smartphone 408 to compare it's location with that of his vehicle, and report to him anytime they are not within a certain distance while the vehicle 402 is powered, i.e., motor/engine running. Or has programmed his home computer 410 to do the same comparison, and report to him via SMS text message when there is a discrepancy. Alternatively, an involved citizen 412 notices the theft of a vehicle 402 and reports it to the LE/ER authorities 406 via cell, text, Smartphone App, web-site, etc.

After notification of the theft, the authorities 406 contact 414 the owner 310, and the owner verifies it (or even initiates the query). The query may be either voice or data (SMS text message, Smartphone messaging (e.g. WhatsApp) Smartphone/Tablet/computer App dedicated to this), at which point the owner verifies the theft and provides appropriate vehicle information 416 (License number, VIN, make, model, color, and any other unique features such as roof rack, spare tire on back door, PIN, password or other suitable Unique ID, etc.). In one embodiment, the appropriate permission can be a stored electronic response or a hard copy could have been filed 312 allowing the LE/ER agency 406 to formally initiate tracking 420. Alternatively, the appropriate permission is obtained and verified from the owner via electronic means (including but not limited to electronic signatures, fax, image/video acknowledgement, approval submission via cell phone, completed PC permission form, recorded verbal reply, electronic signature, etc.), and the tracking request is initiated.

The primary RAID database system 100 identifies the appropriate data level access for each of the one or more authorized LE/ER agents 418, 420, 422 involved in the event. Communication to the various assisting LE/ER agents 418, 422 via NCIC is coordinated and managed by the initial requesting LE/ER entity 420. If a GPS signal is available, RAID can supply additional vehicle location details as requested by the supporting/assisting LE/RE units 418, 422 as approved by the originating LE/ER agency 420.

It may be realistic to get a virtually immediate cell phone or PC notice if one's vehicle is moving when it was left in a parked state by the last authorized operator. RAID's "approval to track" procedures could confirm the smart phone owner as the vehicle owner or approved agent and launch immediate vehicle tracking for LE/ER as well as notify the responsible LE/ER agency.

In one embodiment, communication directly with a vehicle 102 may apply where a vehicle's on-board navigation/reporting signature may be normally in an OFF position, but could be changed to ON by direct remote RAID interaction with its service provider 204. Such may be the case of manufacturer installed navigation equipment, like On-Star GPS enabled vehicles that have not paid their annual navigation package service fee (and thus had their service disconnected). This is similar in fashion to how all cell phones, whether presently registered with a cell phone provider or not, can reach 9-1-1. In one embodiment, rapid GPS location via RAID 100 may aid potential victim recovery and/or prevent loss of life in tornadoes, floods, missing elderly travelers, and many more LE/ER related events where rapid response often defines the outcome and prevent loss of life. Loss of life should not be the penalty paid for not keeping one's navigation package option current on a vehicle.

Enabling the above functions to motorcycles, construction equipment, boats, snowmobiles, jet skis, etc. would allow the tracking of almost all mobile stolen entities by LE/ER agencies.

To maximize the security and functionality of the RAID system 100, its capabilities are intended to be sufficiently robust and flexible to potentially permit fulfilling all the GPS tracking and control interactions suitable for any and all vehicle types directly through the RAID system 100 from the LE/ER agent 102 to the independent provider 202, 204, 206. To accomplish such flexibility and maintain high security levels, RAID communications may involve encrypted communications between the parties, particularly to prevent illegal replication or meaconing by unauthorized parties.

In alternate embodiments, a cell phone app or PC program capable of monitoring and/or controlling a vehicle's GPS to confirm a vehicles location, e.g., vehicle is still parked at the airport or vehicle is on the move but should not be; follow a teen's travels and activities; locate lost or overdue senior relatives, winter travelers, etc. Alternatively, a key fob, cell phone app or PC function may allow an owner/operator to disable a vehicle via a GPS coupled control device like a kill switch making the vehicle inoperative until the process is reversed.

In one embodiment, an auto insurance company may require vehicle or fleet owners to allow and pre-approve GPS tracking in the event of a theft, perhaps at a reduced cost of the comprehensive coverage on all vehicles or at least on high value vehicles. Or vehicle owners with known physical conditions may allow and pre-approve GPS tracking in the event the driver becomes unable to manage the car, e.g., malfunction of handicap controls on the vehicle. Similarly, fleet, construction, military, and recreational vehicles may pre-approve GPS monitoring to reduce risks and losses when these vehicles are unattended and/or parked where they are not readily observable.

Some high risk and specialty vehicles, e.g., gasoline or chemical tank wagons, armored cars, hazardous material transports, compressed flammable gas transports, munitions, etc. may receive constant RAID system 100 monitoring, especially when loaded with hazardous cargo and in-transit. In high risk situations, RAID may maintain constant, progressive en route monitoring to ensure vehicle travels continually comply with a pre-defined route and progress to a defined schedule. In certain cases, LE/ER agencies may have overriding rights to use RAID GPS tracking when; a felony was committed and a vehicle's license plate number is known; a high speed chase has begun and GPS monitoring would assist in vehicle intercept in the shortest possible time to reduce innocent bystander risk, property damage costs and potential loss of life; the GPS is coupled to on-board control devices having remote control capability allowing a fleeing vehicle to be brought to a safe stop per LE authorization and request.

In some alternate embodiments, vehicles buried by floods, mudslides, avalanches, or involved in a suspected health emergency (heart attack/stroke), etc. could readily be located. Similarly, vehicles that have been registered as having tamperproof GPS devices could receive continuously monitored to allow LE/ER agency recovery when the vehicle again appears within the area or a vehicle intercept request is issued to the LE responsible for the area entered by a vehicle of interest. Similarly, some vehicles control devices may be structured to send a distinct/unique "may-day" type signal automatically when/if vehicle tampering is sensed by an onboard controller whether GPS is continuous broadcasting or not; or the vehicle's ignition is "on" but vehicle has been stationary for a period of time, e.g., driver incapacitated.

In some embodiments, when a potential vehicle of interest is defined by LE/ER as so (or a vehicle theft occurs and RAID access guidelines have been complied with), Local, state, or federal law enforcement agencies may retrieve GPS or other data via the license plate number and utilize NCIC to launch a multi-state electronic notification action, so that immediate electronic searching nationwide can begin via the vehicle signature plus conventional visual monitoring for the license plate number (boat bow registration number, plane tail number, etc.).

In alternate embodiments, stationary (bridge, tunnel, toll road) or mobile signal trackers in police cruisers may be automatically enabled to execute immediate pursuit and intercept of the vehicle of interest when either the GPS signature or the RFID tag (e.g. E-ZPass) is detected. In certain cases, if the gravity of certain events warrant it, RAID could be enabled to exercise a X-hours "look-back" request from it's own or separate operator's 202, 204, 206 capability for tracking past reported data elements (locations, services, pass points such as E-ZPass tolls paid or GPS signatures monitored), etc. In one embodiment, such an X-hours before a terrorist attack may provide actual, suspected, or attempted vehicle actions.

RAID system 100 monitoring/control could be utilized for broad based applications involving multiple vehicles such as via controlled access, monitoring all vehicles within the defined perimeter of airports, military bases, government sites, hospitals, refineries, chemicals plants, food processing plants, power generating and water purification sites, etc. including keeping (by remotely disabling them) vehicles from entering/exiting such areas.

CONCLUSION

In bringing closure to the detailed description, it should be noted that it would be obvious to those skilled in the art that many variations and modifications can be made to the preferred embodiment without substantially departing from the principles of the present invention. Also, such variations and modifications are intended to be included herein within the scope of the present invention as set forth in the appended claims. Further, in the claims hereafter, the structures, materials, acts and equivalents of all means or step-plus function elements are intended to include any structure, materials or acts for performing their cited functions.

It should be emphasized that the above-described embodiments of the present invention, particularly any "preferred embodiments" are representative possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

The present invention has been described in sufficient detail with a certain degree of particularity. The utilities thereof are appreciated by those skilled in the art. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

I claim:

1. A rapid access information database (RAID) portal system for mobile entity characteristics aggregation comprising;
   a rapid access information database (RAID) portal comprised of one or more central RAID servers capable of accessing external data about mobile entities, said RAID servers isolated from direct user access and capable of establishing a pre-authorized and approved interface to one or more external proprietary services having systems and databases capable of obtaining either permanent or transient data elements about one or more specific mobile entities registered within said proprietary services; said proprietary services servers forming a network (RAID NET);
   interfacing means for mobile entity owners or authorized agents to register one or more mobile entities regardless of manufacturer with said RAID portal system and legally authorize the level and conditions under which said permanent or transient data elements about each said mobile entity residing in said one or more proprietary services databases may be accessed and provided through said RAID portal system;
   interfacing and action originating means allowing said mobile entity owners or authorized agents to define and initiate a broadcast or query about the permanent or transient data elements for one or more of their registered mobile entities by said RAID portal to said RAID NET;
   communication means for secure interfacing to said RAID portal by mobile entity owners, authorized agents or their intermediaries utilizing said RAID portal system defined access practices;
   legal clearance means to establish the valid specific legal level of access of each said intermediary to each said mobile entity's permanent or transient RAID NET stored data elements and to approve or deny said intermediary's access to said mobile entity's permanent or transient data elements; and
   RAID portal means to aggregate, locate, and compare any responses about said mobile entity's permanent of transient data elements from said RAID NET and communicate appropriate mobile entity's permanent or transient data elements to the appropriately cleared mobile entity owner, authorized agent or their intermediary.

2. The system of claim 1 wherein;
   said mobile entity's permanent data elements include fixed and semi-fixed mobile entity attributes comprised of at least one of:
   type, Vehicle ID Number (VIN), Serial Number, License, Plates, License Plate Number, Highway RFID tag ID or similar characteristic, Owner's information (including name, address, phone numbers), owner authorized agent's information (incl. name, address, phone numbers; and
   said mobile entity's transient data elements include non-fixed attributes that change over time or through the operation of said mobile entity comprised of at least one of the following or similar transient data:
   most recent satellite navigation location, operational status, history of movement, history of operation or history of highway toll RFID transponder reading.

3. The system of claim 2 wherein;
one or more said mobile entity owner, authorized agent or their intermediary use said RAID portal to request the exercise of direct control over said mobile entity's on-board control system capabilities directly through said external proprietary services system's connection to said mobile entity's on-board system.

4. The system of claim 3 wherein;
said legal clearance means comprise written, electronic or verbal legal clearance means to said independent external proprietary services systems and databases.

5. The system of claim 4 further comprising;
one or more system modules using said RAID portal system interfacing means to execute legal owner's or authorized agent's request to perform at least one of the following or similar functions by the mobile entity's on-board controls; turn on vehicle functions, turn off vehicle functions, activate RAID portal monitoring for a specific vehicle or disable a stored or parked vehicle.

6. The system of claim 5 further comprising;
one or more system modules using said RAID portal system interfacing means to allow an intermediary to execute an authorized entity's owner's or authorized agent's requests to respond in a pre-defined manner on their behalf to a mobile entity's transient data differing from at least one of the following or similar conditions; said mobile entity location being outside an owner's or authorized agent's defined area, said mobile entity being operated or controlled in a manner not consistent with owner's or authorized agent's permission or intended use, one or more extended stops, power transitions from on to off exceeding a specified criteria or threshold.

7. The system of claim 4 further comprising;
one or more system modules using said RAID portal system interfacing means as an intermediary permitted to exercise legal owner' or authorized agent's request to respond in a pre-defined manner on their behalf to automatically alert one or more intermediaries after a mobile entity classified as static, stored or parked is powered up or moved, or similar unexpected change in status occurs.

8. A rapid access information database (RAID) portal method for mobile entity characteristics aggregation comprising;
providing access to a rapid access information database (RAID) portal comprised of one or more central RAID servers capable of accessing external data about mobile entities, said RAID servers isolated from direct user access and capable of establishing a pre-authorized and approved interface to one or more external proprietary services having systems and databases capable of obtaining either permanent or transient data elements about one or more specific mobile entities registered within said proprietary services; said proprietary services servers forming a network (RAID NET);
providing interfacing means for mobile entity owners or authorized agents to register one or more mobile entities regardless of manufacturer with said RAID portal system and legally authorize the level and conditions under which said permanent or transient data elements about each said mobile entity residing in said one or more proprietary services databases may be accessed and provided through said RAID portal system;
providing interfacing and action originating means allowing said mobile entity owners or authorized agents to define and initiate a broadcast or query about the permanent or transient data elements for one or more of their registered mobile entities by said RAID portal to said RAID NET;
providing communication means for secure interfacing to said RAID portal by mobile entity owners, authorized agents or their intermediaries utilizing said RAID portal system defined access practices;
providing legal clearance means to establish the valid specific legal level of access of each said intermediary to each said mobile entity's permanent or transient RAID NET stored data elements and to approve or deny said intermediary's access to said mobile entity's permanent or transient data elements; and
providing RAID portal means to aggregate, locate, and compare any responses about said mobile entity's permanent of transient data elements from said RAID NET and communicate appropriate mobile entity's permanent or transient data elements to the appropriately cleared mobile entity owner, authorized agent or their intermediary.

9. The method of claim 8 wherein;
said mobile entity's permanent data elements include fixed and semi-fixed mobile entity attributes comprised of at least one of:
type, Vehicle ID Number (VIN), Serial Number, License, Plates, License Plate Number, Highway RFID tag ID or similar characteristic, Owner's information (including name, address, phone numbers), owner authorized agent's information (incl. name, address, phone numbers); and
said mobile entity's transient data elements include non-fixed attributes that change over time or through the operation of said mobile entity comprised of at least one of the following or similar transient data:
most recent satellite navigation location, operational status, history of movement, history of operation or history of highway toll RFID transponder reading.

10. The method of claim 9 wherein;
one or more said mobile entity owner, authorized agent or their intermediary use said RAID portal to request the exercise of direct control over said mobile entity's on-board control system capabilities directly through said external proprietary services system's connection to said mobile entity's on-board system.

11. The method of claim 10 wherein;
said legal clearance means comprise written, electronic or verbal legal clearance means to said independent external proprietary services systems and databases.

12. The method of claim 11 further comprising;
one or more system modules using said RAID portal system interfacing means to execute a legal owner's or authorized agent's request to perform at least one of the following or similar functions by the mobile entity's on-board controls; turn on vehicle functions, turn off vehicle functions, activate RAID portal monitoring for a specific vehicle or disable a stored or parked vehicle.

13. The method of claim 12 further comprising;
one or more system modules using said RAID portal system interfacing means to allow an intermediary to execute an authorized entity's owner's or authorized agent's requests to respond in a pre-defined manner on their behalf to a mobile entity's transient data differing from at least one of the following or similar conditions; said mobile entity location being outside an owner's or authorized agent's defined area, said mobile entity being operated or controlled in a manner not consistent with owner's or authorized agent's permission or intended use, one or more extended stops, power transitions from on to off exceeding a specified criteria or threshold.

14. The method of claim 11 further comprising;
one or more system modules using said RAID portal system interfacing means as an intermediary permitted to exercise a legal owner' or authorized agent's request to respond in a pre-defined manner on their behalf to automatically alert one or more intermediaries after a mobile entity classified as static, stored or parked is powered up or moved, or similar unexpected change in status occurs.

15. A non-transitory processor-readable medium for storing alpha or numeric code for a rapid access information database (RAID) portal system for mobile entity characteristics aggregation comprising;
a rapid access information database (RAID) portal comprised of one or more central RAID servers capable of accessing external data about mobile entities, said RAID servers isolated from direct user access and capable of establishing a pre-authorized and approved interface to one or more external proprietary services having systems and databases capable of obtaining either permanent or transient data elements about one or more specific mobile entities registered within said proprietary services; said proprietary services servers forming a network (RAID NET);
interfacing means for mobile entity owners or authorized agents to register one or more mobile entities regardless of manufacturer with said RAID portal system and legally authorize the level and conditions under which said permanent or transient data elements about each said mobile entity residing in said one or more proprietary services databases may be accessed and provided through said RAID portal system;
interfacing and action originating means allowing said mobile entity owners or authorized agents to define and initiate a broadcast or query about the permanent or transient data elements for one or more of their registered mobile entities by said RAID portal to said RAID NET;
communication means for secure interfacing to said RAID portal by mobile entity owners, authorized agents or their intermediaries utilizing said RAID portal system defined access practices;
legal clearance means to establish the valid specific legal level of access of each said intermediary to each said mobile entity's permanent or transient RAID NET stored data elements and to approve or deny said intermediary's access to said mobile entity's permanent or transient data elements; and
RAID portal means to aggregate, locate, and compare any responses about said mobile entity's permanent of transient data elements from said RAID NET and communicate appropriate mobile entity's permanent or transient data elements to the appropriately cleared mobile entity owner, authorized agent or their intermediary.

16. The non-transitory processor-readable medium for storing alpha or numeric code of claim 15 wherein;
said mobile entity's permanent data elements include fixed and semi-fixed mobile entity attributes comprised of at least one of:
type, Vehicle ID Number (VIN), Serial Number, License, Plates, License Plate Number, Highway RFID tag ID or similar characteristic, Owner's information (including name, address, phone numbers), owner authorized agent's information (incl. name, address, phone numbers; and
said mobile entity's transient data elements include non-fixed attributes that change over time or through the operation of said mobile entity comprised of at least one of the following or similar transient data:
most recent satellite navigation location, operational status, history of movement, history of operation or history of highway toll RFID transponder reading.

17. The non-transitory processor-readable medium for storing alpha or numeric code of claim 16 wherein;
one or more said mobile entity owner, authorized agent or their intermediary use said RAID portal to request the exercise of direct control over said mobile entity's on-board control system capabilities directly through said external proprietary services system's connection to said mobile entity's on-board system.

* * * * *